(12) United States Patent
Breton et al.

(10) Patent No.: US 9,434,848 B1
(45) Date of Patent: Sep. 6, 2016

(54) PROCESS BLACK INK COMPOSITIONS AND USES THEREOF

(71) Applicant: XEROX CORPORATION, Norwalk, CT (US)

(72) Inventors: Marcel P. Breton, Mississauga (CA); C. Geoffrey Allen, Mississauga (CA); Biby E. Abraham, Mississauga (CA); Carolyn Moorlag, Mississauga (CA); Mihaela Maria Birau, Mississauga (CA); Aurelian Valeriu Magdalinis, Aurora (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/635,679

(22) Filed: Mar. 2, 2015

(51) Int. Cl.
| | |
|---|---|
| *B41J 2/21* | (2006.01) |
| *C09D 11/107* | (2014.01) |
| *C09D 11/30* | (2014.01) |
| *C09D 11/322* | (2014.01) |
| *C09D 11/32* | (2014.01) |
| *C09D 11/40* | (2014.01) |
| *B41J 2/14* | (2006.01) |

(52) U.S. Cl.
CPC ............. *C09D 11/107* (2013.01); *B41J 2/21* (2013.01); *C09D 11/30* (2013.01); *B41J 2/14024* (2013.01); *C09D 11/32* (2013.01); *C09D 11/322* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 3,945,957 A | 3/1976 | Noshiro et al. | |
| 4,304,601 A | 12/1981 | Sharp | |
| 4,403,550 A | 9/1983 | Sharp | |
| 4,445,432 A | 5/1984 | Ford, Jr. et al. | |
| 4,806,391 A | 2/1989 | Shorin | |
| 4,911,999 A | 3/1990 | Legere | |

(Continued)

FOREIGN PATENT DOCUMENTS

| | | | |
|---|---|---|---|
| JP | 03069954 A | * | 3/1991 |
| JP | 2011208019 A | | 10/2011 |
| WO | 2013119539 A1 | | 8/2013 |

OTHER PUBLICATIONS

Allen et al, "Acrylate Ink Compositions for Ink-Based Digital Lithographic Printing," U.S. Appl. No. 14/610,437, filed Jan. 30, 2015.

(Continued)

*Primary Examiner* — Lisa M Solomon
(74) *Attorney, Agent, or Firm* — MH2 Technology Law Group LLP (57) ABSTRACT

The present disclosure is directed to a process black ink composition for digital offset printing including a cyan colorant including a cyan pigment, a magenta colorant including a magenta pigment and a yellow colorant including a yellow pigment, wherein the process black ink composition includes a total amount of pigment of at least about 15 wt %, a photo-initiator, a dispersant, and a curable ink vehicle component including at least one component selected from a curable monomer or a curable oligomer wherein the process black ink composition comprises a ratio of the cyan colorant to the yellow colorant of 0.70-0.80:1.0 and a ratio of the magenta colorant to the yellow colorant of 0.90-0.80:1.0, and wherein the process black ink composition does not comprise carbon black. Methods of preparing the present process black ink composition and using the process black ink composition are also provided.

17 Claims, 6 Drawing Sheets

(56) References Cited

U.S. PATENT DOCUMENTS

| | | |
|---|---|---|
| 4,927,180 A | 5/1990 | Trundle et al. |
| 5,085,698 A | 2/1992 | Ma et al. |
| 5,502,476 A | 3/1996 | Neal et al. |
| 5,834,118 A | 11/1998 | Ranby et al. |
| 5,886,067 A | 3/1999 | Li et al. |
| 6,114,489 A | 9/2000 | Vicari et al. |
| 6,329,446 B1 | 12/2001 | Sacripante et al. |
| 6,348,561 B1 | 2/2002 | Mychajlowskij et al. |
| 6,664,015 B1 | 12/2003 | Sacripante |
| 6,896,937 B2 | 5/2005 | Woudenberg |
| 7,022,752 B2 | 4/2006 | Hayashi et al. |
| 7,151,153 B2 | 12/2006 | Bruchmann et al. |
| 7,202,006 B2 | 4/2007 | Chopra et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,124,791 B2 | 2/2012 | Shinjo et al. |
| 8,158,693 B2 | 4/2012 | Breton et al. |
| 8,222,313 B2 | 7/2012 | Iftime et al. |
| 8,771,787 B2 | 7/2014 | Breton et al. |
| 9,359,512 B2 | 6/2016 | Moorlag et al. |
| 2002/0040073 A1 | 4/2002 | Stone et al. |
| 2002/0107303 A1 | 8/2002 | Miyabashi et al. |
| 2003/0003323 A1 | 1/2003 | Murakami |
| 2003/0044691 A1 | 3/2003 | Setthachayanon et al. |
| 2003/0149130 A1 | 8/2003 | Kondo |
| 2004/0063809 A1 | 4/2004 | Fu et al. |
| 2004/0132862 A1 | 7/2004 | Woudenberg |
| 2004/0233465 A1 | 11/2004 | Coyle |
| 2006/0054040 A1 | 3/2006 | Daems et al. |
| 2007/0166479 A1 | 7/2007 | Drake et al. |
| 2007/0259986 A1 | 11/2007 | Elwakil et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0110843 A1 | 4/2009 | Halahmi et al. |
| 2009/0135239 A1 | 5/2009 | Chretien et al. |
| 2009/0280302 A1 | 11/2009 | Fukumoto et al. |
| 2010/0020123 A1 | 1/2010 | Hirato |
| 2010/0067056 A1 | 3/2010 | Rich et al. |
| 2010/0239777 A1 | 9/2010 | Nakajima et al. |
| 2011/0045199 A1* | 2/2011 | Cong .................. C08F 2/48 427/487 |
| 2011/0141187 A1 | 6/2011 | Takabayashi |
| 2011/0188023 A1 | 8/2011 | Rondon et al. |
| 2011/0262711 A1 | 10/2011 | Chopra et al. |
| 2012/0040156 A1 | 2/2012 | Ohashi et al. |
| 2012/0103212 A1 | 5/2012 | Stowe et al. |
| 2012/0103213 A1 | 5/2012 | Stowe |
| 2012/0103218 A1 | 5/2012 | Stowe et al. |
| 2012/0103221 A1 | 5/2012 | Stowe et al. |
| 2013/0050366 A1* | 2/2013 | Sasada .................. C09D 11/101 347/100 |
| 2013/0104756 A1 | 5/2013 | Stowe et al. |
| 2013/0305946 A1 | 11/2013 | Iftime et al. |
| 2013/0305947 A1 | 11/2013 | Iftime et al. |
| 2013/0307913 A1 | 11/2013 | Kawashima et al. |
| 2013/0310479 A1 | 11/2013 | Lee et al. |
| 2013/0310517 A1 | 11/2013 | Lee et al. |
| 2013/0324653 A1 | 12/2013 | Bollard et al. |
| 2014/0235752 A1 | 8/2014 | Gharapetian et al. |
| 2014/0333704 A1 | 11/2014 | Takabayashi et al. |
| 2014/0340455 A1 | 11/2014 | Breton et al. |
| 2015/0077501 A1 | 3/2015 | Breton et al. |
| 2015/0093690 A1 | 4/2015 | Shimura et al. |
| 2015/0174887 A1 | 6/2015 | Moorlag et al. |
| 2015/0175820 A1 | 6/2015 | Breton et al. |
| 2015/0175821 A1 | 6/2015 | Moorlag et al. |
| 2016/0090490 A1 | 3/2016 | Moorlag et al. |

OTHER PUBLICATIONS

Birau et al., "White Ink Composition for Ink-Based Digital Printing," U.S. Appl. No. 14/619,820, filed Feb. 11, 2015.

Moorlag et al., "Hyperbranched Ink Compositions for Controlled Dimensional Change and Low Energy Curing," U.S. Appl. No. 14/620,945, filed Feb. 12, 2015.

Allen et al., "Acrylate Ink Compositions for Ink-Based Digital Lithographic Printing," U.S. Appl. No. 14/573,913, filed Dec. 17, 2014.

Communication dated May 4, 2015, issued in EP Appl. No. 14196839.6, pp. 1-5.

Leach, et al., "The Printing Ink Manual, 5th Edition", Blue Print, New York, pp. 84-86, 516, 525, 544-550, 724-726 (1993).

Henri Bouas-Laurent, et al., Organic Photochromism (IUPAC Technical Report), Pure Appl. Chem., vol. 73, No. 4, pp. 639-665, 2001.

Thesis of Enrique Michel-Sanchez, Impact of Particle Morphology on the Rheology of PCC-Based Coatings, Aug. 2005.

Breton, et al., "Water-Dilutable Inks and Water-Diluted Radiation Curable Inks Useful for Ink-Based Digital Printing", U.S. Appl. No. 13/897,300, filed May 17, 2013.

Allen, et al., "Acrylate Ink Compositions for Ink-Based Digital Lithographic Printing", U.S. Appl. No. 14/645,153, filed Mar. 11, 2015.

Lee, et al., "Methods for Manufacturing Curable Inks for Digital Offset Printing Applications and the Inks Made Therefrom", U.S. Appl. No. 13/947,959, filed Jul. 22, 2013.

Iftime et al., "Fluorescent Security Enabled Ink for Digital Offset Printing Applications", U.S. Appl. No. 13/473,791, filed May 17, 2012.

Iftime, et al., "Photochromic Security Enabled Ink for Digital Offset Printing Applications", U.S. Appl. No. 13/473,921, filed May 17, 2012.

Moorlag, et al., "Methods for Ink-Based Digital Printing With High Ink Transfer Efficiency", U.S. Appl. No. 14/139,690, filed Dec. 23, 2013.

Breton, et al., "Aqueous Dispersible Polymer Inks", U.S. Appl. No. 14/139,708, filed Dec. 23, 2013.

Moorlag, et al., "Inverse Emulsion Acrylate Ink Compositions for Ink-Based Digital Lithographic Printing", U.S. Appl. No. 14/501,071, filed Sep. 30, 2013.

Lee, et al., "Methods for Manufacturing Curable Inks for Digital Offset Printing Applications and the Inks Made Therefrom ", U.S. Appl. No. 13/474,185, filed May 17, 2012.

Breton, et al., "White Ink Composition for Ink-Based Digital Printing", U.S. Appl. No. 14/028,369, filed Sep. 16, 2013.

* cited by examiner

PROCESS BLACK INK COMPOSITIONS AND USES THEREOF

FIELD OF DISCLOSURE

The present disclosure relates to digital offset printing. In particular, this disclosure relates to black inks suitable for digital offset printing, among other printing applications.

BACKGROUND

Typical lithographic and offset printing techniques utilize plates that are permanently patterned, and are, therefore, useful only when printing a large number of copies of the same image, such as magazines, newspapers, and the like. Variable data digital lithography or digital offset lithographic printing has been developed as a system that uses a non-patterned re-imageable surface on an imaging member (printable blanket), which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. Ink applied thereover is retained in the pockets formed by the removal of the dampening fluid. The inked surface is then brought into contact with a substrate, such as paper, plastic or metal, and the ink transfers from the pockets in the dampening fluid layer to the substrate. The dampening fluid may then be removed, a new uniform layer of dampening fluid applied to the re-imageable surface and the process repeated.

In order to meet digital offset printing requirements, the inks used with digital offset printing architectures typically should possess many desirable physical and chemical properties. The inks should be compatible with the materials it is in contact with, including the printing plate, the dampening fluid, the paper and the various rollers. The digital offset printing ink also should meet all functional requirements for transfer and curing.

Many black inks in the art, however, pose challenges when used with digital offset printing architecture. Such inks, usually formulated with carbon black, broadly absorb UV radiation and are inherently more difficult to cure than colored inks. High viscosity carbon black inks, which are best suitable for digital offset printing, are even more of a challenge since these printing processes may include the addition of rheology modifiers that further negatively impact the cure of carbon black inks. Moreover, carbon black inks are also capable of interacting with the carbon black containing blankets, resulting in transfer issues. High transfer efficiency is necessary for high resolution digital imaging. Accordingly, there remains a need in the art for black ink formulations that may be efficaciously used with digital offset printing.

SUMMARY

The present disclosure is directed to a process black ink composition for digital offset printing including a cyan colorant including a cyan pigment, a magenta colorant including a magenta pigment and a yellow colorant including a yellow pigment, wherein the process black ink composition includes a total amount of pigment of at least about 15 wt %, a photo-initiator, a dispersant, and a curable ink vehicle component including at least one component selected from a curable monomer or a curable oligomer; wherein the process black ink composition comprises a ratio of the cyan colorant to the yellow colorant of 0.70-0.80:1.0 and a ratio of the magenta colorant to the yellow colorant of 0.90-0.80:1.0, and wherein the process black ink composition does not comprise carbon black.

The present disclosure also provides a method of preparing a process black ink composition, the method including a) providing a cyan colorant comprising a cyan pigment, a magenta colorant comprising a magenta pigment and a yellow colorant comprising a yellow pigment, wherein a ratio of the cyan colorant to the yellow colorant is 0.70-0.80:1.0 and a ratio of the magenta colorant to the yellow colorant is 0.90-0.80:1.0; b) acoustically mixing the pigments; c) acoustically mixing a photo-initiator; a dispersant and at least one curable ink vehicle component selected from a monomer or an oligomer with the acoustically mixed pigments to form a curable ink mixture, d) milling the curable ink mixture formed in c) to obtain a process black ink composition, wherein the process black ink composition does not comprise carbon black.

Also provided herein is a method of halftone printing, the method including providing a cyan ink composition, a magenta ink composition and a yellow ink composition, applying the cyan ink composition, the magenta ink composition and the yellow ink composition onto a re-imageable imaging member surface, wherein a ratio of the cyan ink composition to the yellow ink composition is 0.70-0.80:1.0 and a ratio of the magenta ink composition to the yellow ink composition is 0.90-0.80:1.0; forming an ink image; transferring the ink image from the re-imageable surface of the imaging member onto a printable substrate to form a halftone black image; wherein the halftone black image does not include carbon black, wherein the cyan ink composition includes at least about 15% by weight of a cyan pigment, the magenta ink composition includes at least about 15% by weight of a magenta pigment and the yellow ink composition includes at least about 15% by weight of a yellow pigment, and wherein the cyan ink composition, the magenta ink composition and the yellow ink composition each further Includes: a photo-initiator, a dispersant and a curable ink vehicle component including at least one component selected from a curable monomer or a curable oligomer.

DETAILED DESCRIPTION

Process Black Ink Composition

Exemplary embodiments are described in detail below in formulation and in use. It is envisioned, however, that any system that incorporates features of the systems and compositions, as set forth below may be encompassed by the scope and spirit of the exemplary embodiments.

Exemplary embodiments are intended to cover alternatives, modifications, and equivalents as may be included within the spirit and scope of the compositions and systems described in detail below.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Reference is made to the drawings to accommodate understanding of the black ink compositions, methods, and systems of embodiments.

The present disclosure provides process black inks, which do not contain carbon black and methods of printing using these inks. The process black inks of the present disclosure exhibit excellent transfer efficiency and cure performance as well as low blanket contamination when using digital offset printing architecture. The present black inks are formulated to contain only cyan, magenta and yellow colorants, such as pigments and/or are prepared by mixing cyan, magenta and yellow inks. A process black ink image may be obtained either by: 1) using the present process black ink in a digital offset printing architecture, or 2) using halftone printing of cyan, magenta and yellow inks in a digital offset printing architecture in the ratios described herein to obtain a process black ink image. The advantages in both instances are good cure, high transfer efficiency, and low blanket contamination. In the case of a printed process black obtained by using the three colors, one color station may be removed in the digital offset printing architecture or flexibility may be increased due to the ability to introduce a specialty ink (such as white or silver) into a $4^{th}$ ink tower of the architecture.

As used herein "process black" refers to black ink made from a mixture of three colorants, cyan, magenta and yellow. In some embodiments, the colorants are mixed with a curable vehicle component that includes at least one curable monomer and/or curable oligomer, at least one photo-initiator, optionally at least one stabilizer and optionally at least one filler. In some embodiments, the process black ink composition of the present disclosure does not include carbon black.

The cyan colorant includes any desired or effective cyan colorant including pigments, mixtures of pigments, mixtures of pigments and dyes, and the like, provided that the cyan colorant may be dissolved or dispersed in at least one curable monomer or at least one curable oligomer and at least one dispersant. In specific embodiments, the cyan colorant is a pigment.

Examples of suitable cyan pigments for use with the process black ink composition of the present disclosure include copper tetra(octadecyl sulfonamido) phthalocyanine, x-copper phthalocyanine pigment listed in the Color Index (C.I.) as C.I. 74160, C. I. Pigment Blue-1, C. I. Pigment Blue-2, C. I. Pigment Blue-3, C. I. Pigment Blue-15, C. I. Pigment Blue-15:2, C. I. Pigment Blue-15:3, C. I. Pigment Blue-15:4, C. I. Pigment Blue-16, C. I. Pigment Blue-22 and the like. In some embodiments, Pigment Blue 15:3 is used, such as Hostaperm Blue B4G from Clariant International Ltd Muttenz, Switzerland or Irgalite® Blue GLO from Ciba Specialty Chemicals, Tarrytown, N.Y.

In some embodiments, the cyan pigment may be present in the process black ink composition of the instant disclosure in any desired or effective amount. For example, the cyan pigment may be present in the instant process black ink composition in an amount (by weight) ranging from 0%-20%, such as 0%-10%, such as 4%-5%, e.g. 4.28% or 4.6% based upon the total weight of the present process black ink composition.

The magenta colorant includes any desired or effective magenta colorant including pigments, mixtures of pigments, mixtures of pigments and dyes, and the like, provided that the magenta colorant may be dissolved or dispersed in at least one curable monomer or at least one curable oligomer and at least one dispersant. In specific embodiments, the magenta colorant is a pigment.

Examples of suitable magenta pigments for use with the process black ink composition of the present disclosure include C. I. Pigment Red-5, C. I. Pigment Red-7, C. I. Pigment Red-12, C. I. Pigment Red-48, C. I. Pigment Red-48:1, C. I. Pigment Red-57, C. I. Pigment Red-112, C. I. Pigment Red-122, C. I. Pigment Red-123, C. I. Pigment Red-146, C. I. Pigment Red-168, C. I. Pigment Red-184, C. I. Pigment Red-202, C. I. Pigment Red-207. In specific embodiments, a monoazo lithol rubine pigment such as Pigment Red 57:1 having a Color Index of 15850:1 is used, such as Permanent Rubine L5B01 from Clariant International Ltd Muttenz, Switzerland.

In some embodiments, the magenta pigment may be present in the process black ink composition of the instant disclosure in any desired or effective amount. For example, the magenta pigment may be present in the process black ink composition of the instant disclosure in an amount (by weight) ranging from 0%-20%, such as 0%-10%, such as 4%-7%, e.g. 5.4% or 4.9%.

The yellow colorant includes any desired or effective yellow colorant including pigments, mixtures of pigments, mixtures of pigments and dyes, and the like, provided that the yellow colorant may be dissolved or dispersed in at least one curable monomer or at least one curable oligomer and at least one dispersant. In specific embodiments, the yellow colorant is a pigment.

Examples of suitable yellow pigments for use with the process black ink composition of the present disclosure include: C. I. Pigment Yellow-12, C. I. Pigment Yellow-13, C. I. Pigment Yellow-14, C. I. Pigment Yellow-16, C. I. Pigment Yellow-17, C. I. Pigment Yellow-74, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151, C. I. Pigment Yellow-154. In specific embodiments, C.I. Pigment Yellow 13 or C. I. Pigment Yellow 14 is used.

In some embodiments, the yellow pigment may be present in the process black ink composition of the instant disclosure in any desired or effective amount. For example, the yellow pigment may be present in the process black ink composition of the instant disclosure in an amount (by weight) ranging from 0%-20%, such as 0%-10%, such as 4%-7%, e.g. 6.1%.

In some embodiments, the total amount of pigment (cyan, magenta and yellow pigment) in the process black ink composition of the present disclosure is between 10 wt %-30 wt %, such as 10 wt % to 20 wt %, such as 10 wt % to 15 wt %. In some embodiments, the total amount of pigment in the process black ink composition of the present disclosure is at least about 15 wt %.

In some embodiments, the ratio of cyan colorant to yellow colorant is at least about 0.65:1 to about 0.85:1, such as about 0.70-0.80:1, such as about 0.70-0.76:1. In some embodiments, the ratio of cyan colorant to yellow colorant is 0.70:1. In other embodiments, the ratio of cyan colorant to yellow colorant is about 0.76:1.

In some embodiments, the ratio of cyan colorant to yellow colorant is at least about 0.65:1 to about 0.85:1, such as about 0.70-0.80:1, such as about 0.70-0.76:1. In some embodiments, the ratio of cyan colorant to yellow colorant is 0.70:1. In other embodiments, the ratio of cyan colorant to yellow colorant is about 0.76:1.

In some embodiments, the ratio of magenta colorant to yellow colorant is at least about 0.75:1 to about 0.85:1, such as about 0.80-0.90:1, such as about 0.80-0.88:1. In some embodiments, the ratio of magenta colorant to yellow colorant is 0.88:1. In other embodiments, the ratio of cyan colorant to yellow colorant is about 0.80:1.

For example, in specific embodiments, the carbon black-free process black ink composition of the present disclosure includes a cyan colorant, which is a pigment, such as Pigment Blue 15:3, a magenta colorant, which is a pigment, such as Pigment Red 57:1 and a yellow colorant, which is a pigment, such as Pigment Yellow 14 or Pigment Yellow 13, wherein each of the pigments, respectively, are used at a ratio of 0.70:0.88:1.0. In some embodiments, the ratio of Pigment Blue 15:3:Pigment Red 57:1:Pigment Yellow 14 or Pigment Yellow 13 is 0.76:0.80:1.0.

In some embodiments, the process black ink of the present disclosure further comprises a vehicle including dispersants, a curable vehicle component including curable monomers or oligomers, photo-initiators, optionally stabilizers and optionally fillers. In embodiments, suitable dispersants include copolymers and block copolymers containing pigment affinic groups, such as amines, esters, alcohols and carboxylic acids. Illustrative examples of suitable dispersants include dispersants selected from Efka® 4008, Efka® 4009, Efka® 4047, Efka® 4520, Efka® 4010, Efka® 4015, Efka® 4020, Efka® 4050, Efka® 4055, Efka® 4080, Efka® 4300, Efka® 4330, Efka® 4400, Efka® 4401, Efka® 4403, Efka® 4406, Efka® 4800, all available from BASF, Charlotte, N.C. Disperbyk® 101, Disperbyk® 102, Disperbyk® 107, Disperbyk® 108, Disperbyk® 109, Disperbyk® 110, Disperbyk® 111, Disperbyk® 112, Disperbyk® 115, Disperbyk® 162, Disperbyk® 163, Disperbyk® 164, Disperbyk® 2001, all available from BYK Additives & Instruments, Wesel Germany, Solsperse® 24000 SC/GR, Solsperse® 26000, Solsperse® 32000, Solsperse® 36000, Solsperse® 39000, Solsperse® 41000, Solsperse® 71000 or Solsperse® J-180 all available from Lubrizol Advanced Materials, Inc. Cleveland, Ohio or mixtures or combinations thereof.

In specific embodiments, Solsperse® J-180 or Solsperse® 32000 is used. The dispersant may be present in the process black ink composition of the instant disclosure in an amount of about 0% to about 20% by weight, such as about 1% to about 10% by weight, such as about 4% to about 6% by weight.

In some embodiments, the process black ink composition of the present disclosure includes further components, such as a suitable curable monomer. Examples of suitable materials include radically curable monomer compounds, such as acrylate and methacrylate monomer compounds. Specific examples of acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures and combinations thereof.

In specific embodiments, propoxylated trimethylolpropane triacrylate, such as SR-501 (also known as CD501) from Sartomer Co. is used. The monomers may be present in the process black ink composition of the present disclosure in an amount from about 0% to about 50% by weight, such as about 1% to about 30% by weight, such as about 5% to about 30% by weight, such as about 5.5% to about 11.5% by weight.

In some embodiments, the process black ink composition of the present disclosure includes a curable oligomer. Suitable curable oligomers include, but are not limited to, acrylated polyesters, acrylated polyethers, acrylated epoxies, urethane acrylates, and pentaerythritol tetraacrylate. Specific examples of suitable acrylated oligomers include, but are not limited to, acrylated polyester oligomers, such as CN2255®, CN2256®, CN294E® (Sartomer Co.), and the like, acrylated urethane oligomers, acrylated epoxy oligomers, such as CN2204®, CN110® (Sartomer Co.), and the like and mixtures and combinations thereof. The oligomers may be present in the process black ink composition in an amount of about 0% to about 80% by weight, such as about 1% to about 70% by weight, such as about 4% to about 67% by weight, based upon the total weight of the present process black ink composition.

In some embodiments, CN294E® and CN2256® are used. In some embodiments, CN294E® is present in the process black ink composition in an amount of about 55% to 65% by weight. In some embodiments, CN2256® is present in the process black ink composition in an amount of about 0% to 10% by weight. In some embodiments, CN2256® is used to increase the cohesiveness (for example, decrease the "runniness") of the process black ink composition of the present disclosure.

In some embodiments, the present process black ink composition includes a photo-initiator, such as a α-hydroxyketone photo-initiator (including α-hydroxyketone photoinitiators sold under the trade name IRGACURE® 184, IRGACURE® 500, DAROCUR® 1173, and IRGACURE® 2959, which are manufactured by BASF), α-aminoketone photo-initiators (including α-aminoketone photo-initiators IRGACURE® 369, IRGACURE® 379, IRGACURE® 907, and IRGACURE® 1300, which are manufactured by BASF), and bisacyl phosphine photo-initiators (including bisacyl phosphine photo-initiators sold under the trade name IRGACURE® 819, IRGACURE® 819DW, and IRGACURE® 2022, which are manufactured by BASF). Other suitable photo-initiators include monoacylphosphine oxide and bisacylphosphine oxide, such as 2,4,6-trimethylbenzoy-biphenylphosphine oxide (manufactured by BASF under the trade name LUCIRIN® TPO); ethyl-2,4,6-trimethylbenzoylphenyl phosphinate (manufactured by BASF under the trade name LUCIRIN® TPO-L); mono- and bis-acylphosphine photoinitiators (such IRGACURE® 1700, IRGACURE® 1800, IRGACURE® 1850, and DAROCUR® 4265, manufactured by BASF), benzyldimethyl-ketal photo-initiators (such as IRGACURE® 651, which are manufactured by BASF) and oligo[2-hydroxy-2-methyl-1-[4-(1-methylvinyl)phenyl]propanone] (available as Esacure KIP 150 from Lamberti); and the like, as well as mixtures and combinations thereof.

The photo-initiator may be present in the process black ink composition of the instant disclosure in an amount of about 0% to about 7% by weight, such as about 0% to about 5%, by weight, such as about 1% to about 4% by weight.

In some embodiments, the process black ink composition of the present disclosure comprises a stabilizer, such as IRGASTAB® UV10 available from BASF or CN3216 available from Sartomer Co. The stabilizer may be present in the process black ink composition in an amount of about 0% to about 5% by weight, such as from about 0.9% to about 4% by weight, such as about 1% to about 2% by weight.

In some embodiments, the process black ink composition of the present disclosure includes fillers. Suitable fillers may include, but are not limited to, amorphous, diatomaceous, fumed quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like. In specific embodiments, the filler may be clays from Southern Clay Products, Gonzales Tex., e.g CLAYTONE® HA and CLAYTONE® HY. In some embodiments, filler may be present in the process black ink composition of the present disclosure in an amount from about 0% to about 25% by weight, such as about 1% to about 10% by weight, such as from about 1% to about 5% by weight.

In some embodiments, the color value of the process black ink composition in the present disclosure is described quantitatively using the L*, a*and b* coordinates as defined according to CIELAB®. CIELAB® is color space described by the International Commission on Illumination. According to the CIELAB® definition, the brightness of L*=100 yields white and a brightness of L*=0 yields black. In some embodiments, a targeted level of L* for the process black ink composition in accordance with the present disclosure ranges from about 0-40, such as from about 15-35, such as about 20-25.

As is understood in the art, the "a*" dimension corresponds to the amount of magenta present in the color. Positive "a*" values indicate the presence of magenta and negative "a*" values indicate green. In some embodiments, the a* value of the process black ink composition according the present disclosure ranges from about 1-4, such as about 1.5 to 3.8.

The "b*" dimension corresponds to the amount of cyan or yellow in the color. Positive "b*" values indicate the presence of cyan and negative "b*" values indicate the presence of yellow. In some embodiments, the b* value of the process black ink composition according the present disclosure ranges from about 3-4.5, such as about 4.1-4.3.

In some embodiments, the color values of the process black ink of the present disclosure are determined with reference to image data and a particular color space. A difference may be determined between the identified color values in the selected color space and a predetermined color value for black ink in the color space. This difference refers to a quantifiable amount between color values that may or may not be perceptible to the human eye. In some embodiments, the L*, a* and b* values are assessed using a thin film of the present process black ink composition, the thin film being disposed on a substrate and having an optical density ranging from about 1.0 to about 2.0. In some embodiments, the substrate is XEROX® Digital Color Elite Gloss (DCEG) paper.

In some embodiments, the L*, a*, b* value described above for the process black ink of the present disclosure are compared to a Pantone® Standard for black, e.g., Pantone® Standard for black, wherein L* is 22.07, a* is 1.57 and b* is 4.26 as described in the Examples. As is known in the art, Pantone® is a standardized color matching system, which uses a numbering system for identifying colors.

The term "dE2000" indicates that the standard CIEdE2000 formula, published by the CIELAB®, has been calculated to provide a dE2000 value, which measures the color difference between two colors. The larger the dE2000 value, the larger the color difference. A dE2000 of 1.5 to 2 is generally considered to be at the limit of visual perception. In some embodiments, the dE2000 value of the process black ink compositions of the present disclosure in comparison to a Pantone® Standard is less than 3, such as less than about 2.

In some embodiments, the viscosity of the present process black ink composition drops at higher rates of shear velocity similar to conventional process black ink compositions as demonstrated in the Examples, below. In some embodiments, the process black ink composition of the present disclosure may have a viscosity from about 5,000 centipoise to about 3.66E+6 centipoise at 35° C. at a shear rate of 0.1 sec$^{-1}$, more typically between about 1.00E+5 to about 5.00E+6. Alternatively, the process black ink composition of the present disclosure may have a shear thinning index (viscosity at 40 sec$^{-1}$/viscosity at 10 sec$^{-1}$) at 35° C. of from about 0.10 to about 0.60, more typically about 0.60.

Methods of Preparing the Process Black Ink

The process black ink compositions of the present disclosure can be prepared by any desired or suitable method. In some embodiments, the cyan colorant comprising, for example, a cyan pigment, the magenta colorant comprising, for example, a magenta pigment and the yellow colorant, comprising, for example, a yellow pigment in the ratios described herein may be mixed by acoustic mixing prior to processing the remaining components, e.g. dispersants, monomers, oligomers, photo-initiators, stabilizers and fillers. In some embodiments, the acoustic mixing may be performed using an acoustic mixer, which includes a closed vessel without impellers, and which uses low-frequency, high intensity acoustic energy to provide the desired mixing or blending of the pigments used to prepare the process black ink composition of the present disclosure.

Issues that may arise with the use of conventional mixers that possess impellers include, but are not limited to, a moderate mixing cycle; limited high-viscosity mixing capability; viscous heating; limited filler loading capability; high shear localized mixing; Further, conventional mixing may require contact mixing, and thus impeller cleaning is an additional step that must be utilized in the process.

In contrast, advantages to be found by using an acoustic mixer include, but are not limited to, fast mixing cycle; excellent high-viscosity mixing capability; low heat generation; high rate of filler loading; high intensity mixing throughout the volume of material to be mixed; non-contact, hygienic and sealed mixing.

The selected acoustic mixer in accordance with the present disclosure provides mixing by applying a consistent shear field throughout the entire vessel, and thus may be especially suitable for the mixing of the pigments used to prepare the process black ink composition of the present disclosure.

In some embodiments, a suitable acoustic mixer for use in accordance with the present disclosure include LABRAM mixers and RESONANTACOUSTIC® mixers, without impellers, commercially available from RESODYN™ Acoustic Mixers, Inc. (Butte, Mont.). The acoustic mixer is operated on a resonant frequency. A closely controlled electromechanical oscillator is used to excite the mix material. In some embodiments, the colorants including pigments are mixed with an acoustic mixer at a frequency of from about 15 Hertz to about 2000 Hertz, in embodiments from about 30 Hertz to about 1000 Hertz, for example about 60 Hertz. The entire system may oscillate in resonance, allowing highly efficient energy transfer and rapid mixing of the pigments of the present process black ink composition.

Acoustic mixers, such as those available from RESODYN™ Acoustic Mixers, Inc., apply high intensity, low frequency acoustic energy such as to enable the shearing and extremely efficient mixing of materials in various physical states. In embodiments, optimum wetting of the pigment and then subsequent mixing into the supporting vehicle, e.g. dispersants, monomers, etc. in an acoustic mixer is done at an acceleration of from about 30 to about 110 g's, wherein g is the acceleration of gravity and is defined as approximately 9.81 $m^2/s$, and at an applied percentage intensity of from about 50 to about 100 percent intensity.

In embodiments, an acoustic mixer may handle applications ranging from gas-liquid hydrogenations through powder blending and coating to loaded resins with a viscosity up to about 100 million centipoise (cP), in embodiments from about 1 million cP to about 80 million cP, consistent with viscosities of the process black ink compositions of the present application. Compared with an impeller-based mixer, an acoustic mixer may readily achieve good pigment wetting within a very short time, in embodiments from about 1 minute to about 300 minutes, in other embodiments from about 2 minutes to about 60 minutes, such as about 10 minutes to 60 minutes.

In specific embodiments, the cyan colorant comprising a cyan pigment, a magenta colorant comprising a magenta pigment and a yellow colorant comprising a yellow pigment are wetted with an acoustic mixer such as the RESODYN™ acoustic mixer from RESODYN™ Acoustic Mixers, Inc.

In some embodiments, after the colorants are well blended, the dispersant, curable monomers and/or oligomers, photo-initiators and optionally stabilizers and optionally fillers are added to the acoustically mixed colorants comprising pigments and the mixture is then further subjected to acoustic mixing for about 1 minute to about 300 minutes, in other embodiments from about 2 minutes to about 60 minutes, such as about 10 minutes to 60 minutes. The acoustic mixing is applied at a frequency of about 30 Hertz to about 1000 Hertz, for example about 60 Hertz, at an acceleration of from about 30 to about 110 g's and at an applied percentage intensity of from about 50 to about 100 percent.

In some embodiments, after acoustic mixing, the processed sample is then discharged into a mixing vessel, such as a metal beaker. The vessel is heated to a temperature within the range of from about 40° C. to about 95° C., or from about 55° C. to about 85° C., or from about 65° C. to about 80° C. The homogeneous mixture then is mixed for a period of from about 5 minutes to about 80 minutes or from about 25 to about 60 minutes, or from about 30 to about 45 minutes.

In some embodiments, the homogenous mixture is cooled to about room temperature and then milled. In some embodiments, milling is performed using a 3-roll ball mill, for example, in which the homogenous mixture is passed anywhere from about 2 to about 10 times, or from 3 to 7 times, or 5 times, typically 3 times or more typically 2 times. The pigmented radiation curable ink composition can be milled a sufficient number of times so that the agglomerates that may be present are reduced to a particle size of less than about 1 μm, as measured by a BYK grind gauge, for example, to provide a process black ink composition of the present disclosure. In some embodiments, the particle size is reduced to within the range of from about 0.01 to about 1 μm, or from about 0.05 to about 0.9 μm, or from about 0.1 to about 0.85 μm.

Methods of Digital Offset Printing Using the Present Ink Compositions

The present disclosure further provides a method of digital offset printing, which includes applying the process black ink composition of the present disclosure onto a re-imageable imaging member surface, the re-imageable imaging member having dampening fluid disposed thereon; forming an ink image; and transferring the ink image from the re-imageable surface of the imaging member to a printable substrate.

Figure 1:
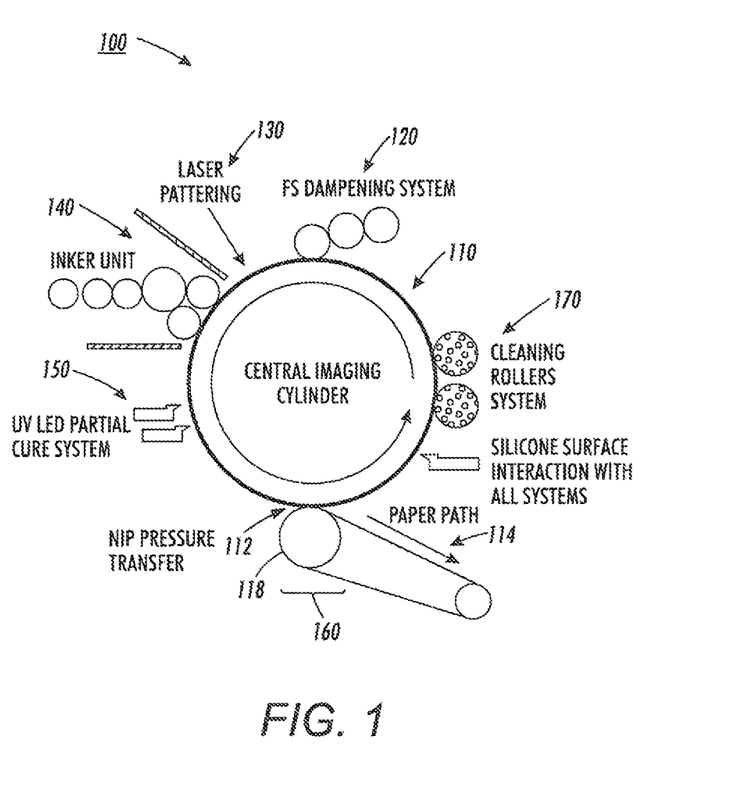
FIG. 1 illustrates a schematic representation of an ink-based variable image digital printing system for use with the present process black ink compositions.

An exemplary digital offset printing architecture is shown in FIG. 1. As seen in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate or a belt, or another now known or later developed configuration. The re-imageable surface 110(*a*) may be formed of materials including, for example, a class of materials commonly referred to as silicones, including fluorosilicone, among others. The re-imageable surface may be formed of a relatively thin layer over a mounting layer, a thickness of the relatively thin layer being selected to balance printing or marking performance, durability and manufacturability.

U.S. patent application Ser. No. 13/095,714 ("714 application"), titled "Variable Data Lithography System," filed on Apr. 27, 2011, now U.S. Publication 2012/0103212, by Timothy Stowe et al., which is commonly assigned, and the disclosure of which is hereby incorporated by reference in its entirety, depicts details of the imaging member 110 including the imaging member 110 being comprised of a re-imageable surface layer 110(*a*) formed over a structural mounting layer that may be, for example, a cylindrical core, or one or more structural layers over a cylindrical core.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 includes, but is not limited to, any particular composition or form such as, for example, paper, plastic, folded paperboard, Kraft paper, clear substrates, metallic substrates or labels. The exemplary system 100 may be used for producing images on a wide variety of image receiving media substrates. The 714 application also explains the wide latitude of marking (printing) materials that may be used.

The exemplary system 100 includes a dampening fluid system 120 generally comprising a series of rollers, which may be considered as dampening rollers or a dampening unit, for uniformly wetting the re-imageable surface of the imaging member 110 with dampening fluid. A purpose of the dampening fluid system 120 is to deliver a layer of dampening fluid, generally having a uniform and controlled thickness, to the re-imageable surface of the imaging member 110. It is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoro-propoxy)pentane), and D4 (octamethylcyclotetrasiloxane). Other suitable dampening fluids are disclosed, by way of example, in co-pending U.S. patent application Ser. No. 13/284,114, filed on Oct. 28, 2011, now U.S. Publication No. 2013/0104756 titled "Dampening Fluid For Digital Lithographic Printing," the disclosure of which is hereby incorporated herein by reference in its entirety.

Once the dampening fluid is metered onto the re-imageable surface of the imaging member 110, a thickness of the dampening fluid may be measured using a sensor (not shown) that may provide feedback to control the metering of the dampening fluid onto the re-imageable surface of the imaging member 110 by the dampening fluid system 120.

After a precise and uniform amount of dampening fluid is provided by the dampening fluid system 120 on the re-imageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The re-imageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the '714 application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the re-imageable surface of the imaging member 110 is presented to an inker subsystem 140. The inker subsystem 140 is used to apply a uniform layer of ink over the layer of dampening fluid and the re-imageable surface layer of the imaging member 110. The inker subsystem 140 may use an anilox roller to meter an offset lithographic ink, such as the process black ink compositions of the present disclosure, onto one or more ink forming rollers that are in contact with the re-imageable surface layer of the imaging member 110. Separately, the inker subsystem 140 may include other traditional elements such as a series of metering rollers to provide a precise feed rate of ink to the re-imageable surface. The inker subsystem 140 may deposit the ink to the pockets representing the imaged portions of the re-imageable surface, while ink on the unformatted portions of the dampening fluid will not adhere to those portions.

The cohesiveness and viscosity of the ink residing in the re-imageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the re-imageable surface to, for example, increase ink cohesive strength relative to the re-imageable surface layer. Curing mechanisms may include optical or photo curing, heat curing, drying, or various forms of chemical curing. After transfer from the re-imageable layer to the substrate, which can be made from paper, plastic or metal, the ink on the substrate then can be exposed again to UV light for final curing of the ink.

In some embodiments, the process black ink composition of the present disclosure demonstrates excellent curing performance. For instance, in some embodiments, the process black ink compositions of the present disclosure require more than 80, such as more than 90, such as more than 100 double MEK rubs for an image having an Optical Density (thickness) of less than 1.7. In other embodiments, the process black ink compositions of the present disclosure require more than 100, such as more than 140, such as more than 160 double MEK rubs for an image having an optical density (thickness) of greater than 1.7, such as 1.8 or such as 1.9. "Double MEK Rub" refers to an Evaluation for Solvent Resistance by a Solvent Rub Test. The test method is used to determine the degree of cure of an ink by the ink resistance to a specified solvent. The solvent rub test usually is performed using methyl ethyl ketone (MEK) as the solvent. The test, such as ASTM D4752, involves rubbing the surface containing the ink with cheesecloth soaked with MEK until failure or breakthrough of the ink occurs. The rubs are counted as a double rub (one rub forward and one rub backward constitutes a double rub).

Referring again to FIG. 1, the ink is transferred from the re-imageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the re-imageable surface of the imaging member 110 is brought into physical contact with the substrate 114. With the adhesion of the ink, such as the process black ink of the present disclosure, having been modified by the rheology control system 150, modified adhesion of the ink causes the ink to adhere to the substrate 114 and to separate from the re-imageable surface of the imaging member 110.

In some embodiments, the process black ink compositions of the present disclosure exhibit high transfer efficiencies from the re-imageable surface of the imaging member to the substrate. In some embodiments, the transfer efficiency is greater than 90%, such as greater than 95% or such as greater than 98%.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid may be removed from the re-imageable surface of the imaging member 110, typically without scraping or wearing that surface. An air knife may be employed to remove residual dampening fluid. It is anticipated, however, that some amount of ink residue may remain. Removal of such remaining ink residue may be accomplished through the use of some form of cleaning subsystem 170. The '714 application describes details of such a cleaning subsystem 170 including at least a first cleaning member such as a sticky or tacky member in physical contact with the re-imageable surface of the imaging member 110, the sticky or tacky member removing residual ink and any remaining small amounts of surfactant compounds from the dampening fluid of the re-imageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The '714 application details other mechanisms by which cleaning of the re-imageable surface of the imaging member 110 may be facilitated. Regardless of the cleaning mechanism, however, cleaning of the residual ink and dampening fluid from the re-imageable surface of the imaging member 110 may be used to prevent ghosting in the system. Once cleaned, the re-imageable surface of the imaging member 110 is again presented to the dampening fluid system 120 by which a fresh layer of dampening fluid is supplied to the re-imageable surface of the imaging member 110, and the process is repeated.

Cyan, Magenta and Yellow Ink Compositions for Use in Forming a Process Black Ink Image In some embodiments, a process black ink image is formed by first preparing a cyan ink composition, a magenta ink composition and a yellow ink composition as described herein and then superimposing the three ink compositions onto a substrate to form an image comprising a process black color.

In some embodiments, an image may be transferred from an imaging member to a substrate, for example, in a single process or using a three part process, wherein 3 images corresponding to the 3 colors can be transferred to a substrate, in which case the substrate would travel around the rollers at nip pressure transfer system 160 as shown in FIG. 1 three times for each transfer. The rheology control system 150 of FIG. 1 may form a partial crosslinking layer of the ink on the re-imageable surface, for example, to increase ink cohesive strength relative to the re-imageable surface layer. Curing mechanisms may include optical or photo curing, heat curing, drying, or various forms of chemical curing. After transfer from the re-imageable layer to the substrate, which can be made from, for example, paper, plastic or metal, the ink on the substrate then can be exposed again to UV light for final curing of the ink. The imaging member 110 of FIG. 1 may be cleaned via cleaning subsystem 170 (FIG. 1) for subsequent image processing as described herein.

In some embodiments, a digital offset color printer using the above-described method for obtaining a process black ink image includes four ink stations. While conventionally, the ink stations include black, cyan, magenta and yellow ink stations, using the present method, the black color station can advantageously be replaced with another color, such as a specialty color, for example silver, since the combination of the cyan, magenta and yellow single color imaging systems may be used to obtain a process black ink image on a substrate.

The cyan ink composition, the magenta ink composition and the yellow ink composition may be formulated using a cyan colorant including, for example, a cyan pigment, a magenta colorant including, for example, a magenta pigment or a yellow colorant comprising, for example, a yellow pigment. The types of cyan colorants, magenta colorants and yellow colorants that may be used in the cyan ink composition, the magenta ink composition and the yellow ink composition, respectively, are as described above for the process black ink composition.

In some embodiments, at least 15 wt %, such as at least 20 wt %, such as at least 35 wt % of cyan pigment, magenta pigment or yellow pigment are included in the cyan ink composition, magenta ink composition or yellow ink composition, respectively. Dispersants, curable monomer or oligomers and optional stabilizers and/or fillers in the types and amounts described herein for the process black ink of the present disclosure may be added to each of the instant cyan, magenta and yellow ink compositions.

In some embodiments, the cyan ink composition, magenta ink composition or the yellow ink composition, respectively, is individually formulated by adding the curable monomer and/or oligomer, dispersants and optional stabilizers into a mixing vessel, such as a metal beaker. The vessel is heated to a temperature within the range of from about 40° C. to about 95° C. or from about 55° C. to about 85° C. or from about 65° C. to about 80° C. In some embodiments, the components are then mixed for a period of from about 5 minutes to about 80 minutes or from about 25 to about 60 minutes or from about 30 to about 45 minutes.

In some embodiments, the colorant comprising, for example, a cyan, magenta or yellow pigment and the photoinitiator(s) are then added to the previously mixed curable vehicle components. In some embodiments, the pigment is wetted by heating the vessel to a temperature within a range of from about 40° C. to about 95° C., or from about 55° C. to about 85° C. or from about 65° C. to about 80° C. The pigment and curable vehicle components are then mixed for a period of from about 5 minutes to about 90 minutes or from about 25 to about 60 minutes, or from about 30 to about 45 minutes. In some embodiments, mixing is performed using high shear mixing, such as a Hockmeyer high shear mixer (Hockmeyer Equipment Corporation, Elizabeth City, N.C.), for example, at a speed from about 800-7000 rpm, such as about 800 rpm to about 5000 rpm. In some embodiments, a filler such as clay, is then added to the heated mixture and the components are further mixed using high shear mixing for about 5 minutes to about 80 minutes.

In some embodiments, the mixture is then milled as described herein to form a cyan ink composition, a magenta ink composition or a yellow ink composition. For example, the mixture may be milled using a 3-roll mill three times. In other embodiments, a portion of the mixture is milled three times and a second portion is milled only two times. The thus prepared cyan, magenta and yellow ink compositions may then be used in combination to form a process black ink image.

In other embodiments, the cyan ink composition, magenta ink composition and/or the yellow ink composition are individually formulated by adding the curable vehicle components and a colorant including a pigment into an acoustic mixer and acoustically mixing the components as described above. The mixture is then transferred to a mixing vessel, such as a stainless steel beaker. The vessel is heated to a temperature within the range of from about 40° C. to about 95° C. or from about 55° C. to about 85° C. or from about 65° C. to about 80° C. In some embodiments, the components are then mixed with an anchor impeller for a period of from about 5 minutes to about 80 minutes or from about 25 to about 60 minutes, or from about 30 to about 45 minutes, at a speed ranging from 500-5000 rpm, such as from 800 to 1000 rpm. In some embodiments, the mixture is then milled for up to three passes, for example, two passes.

Figure 2:
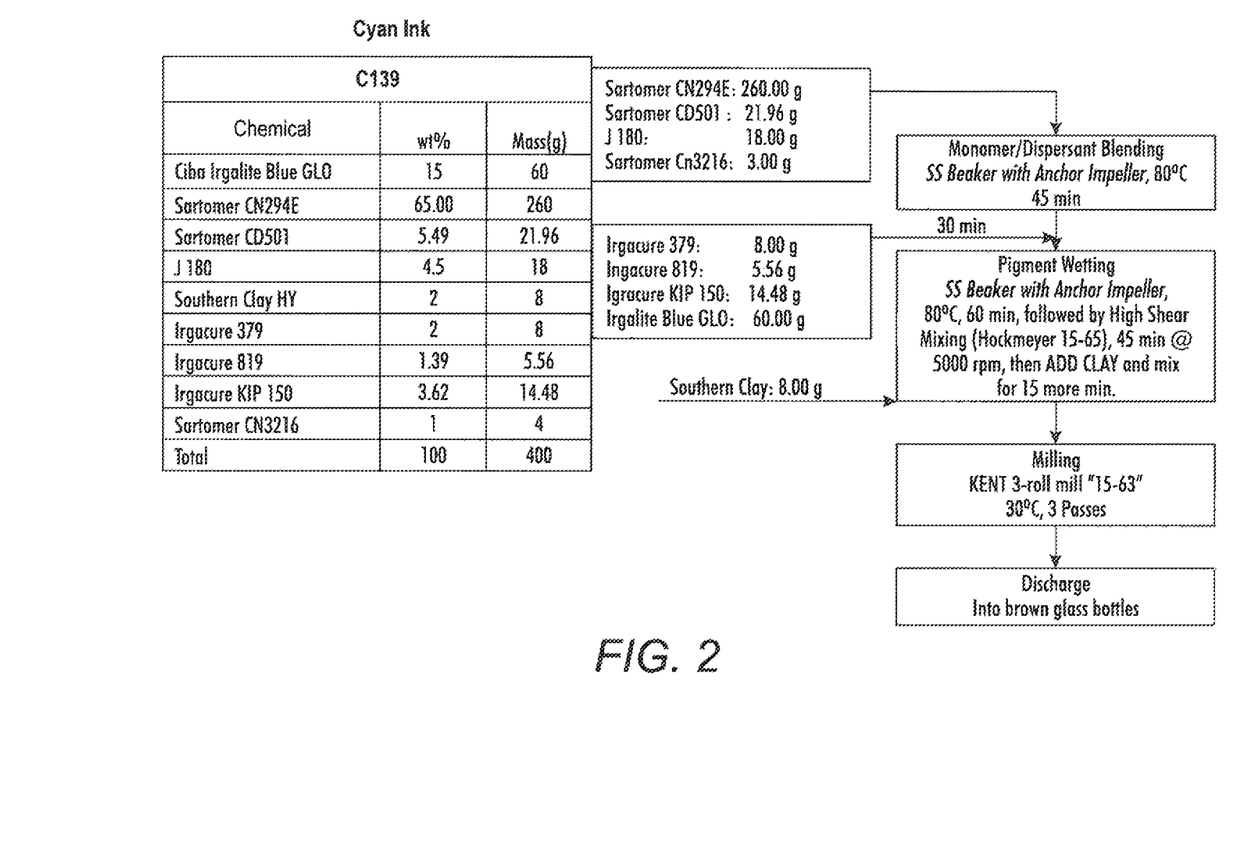
FIG. 2 illustrates an exemplary embodiment for preparing cyan ink as described in the Examples.
Figure 3:
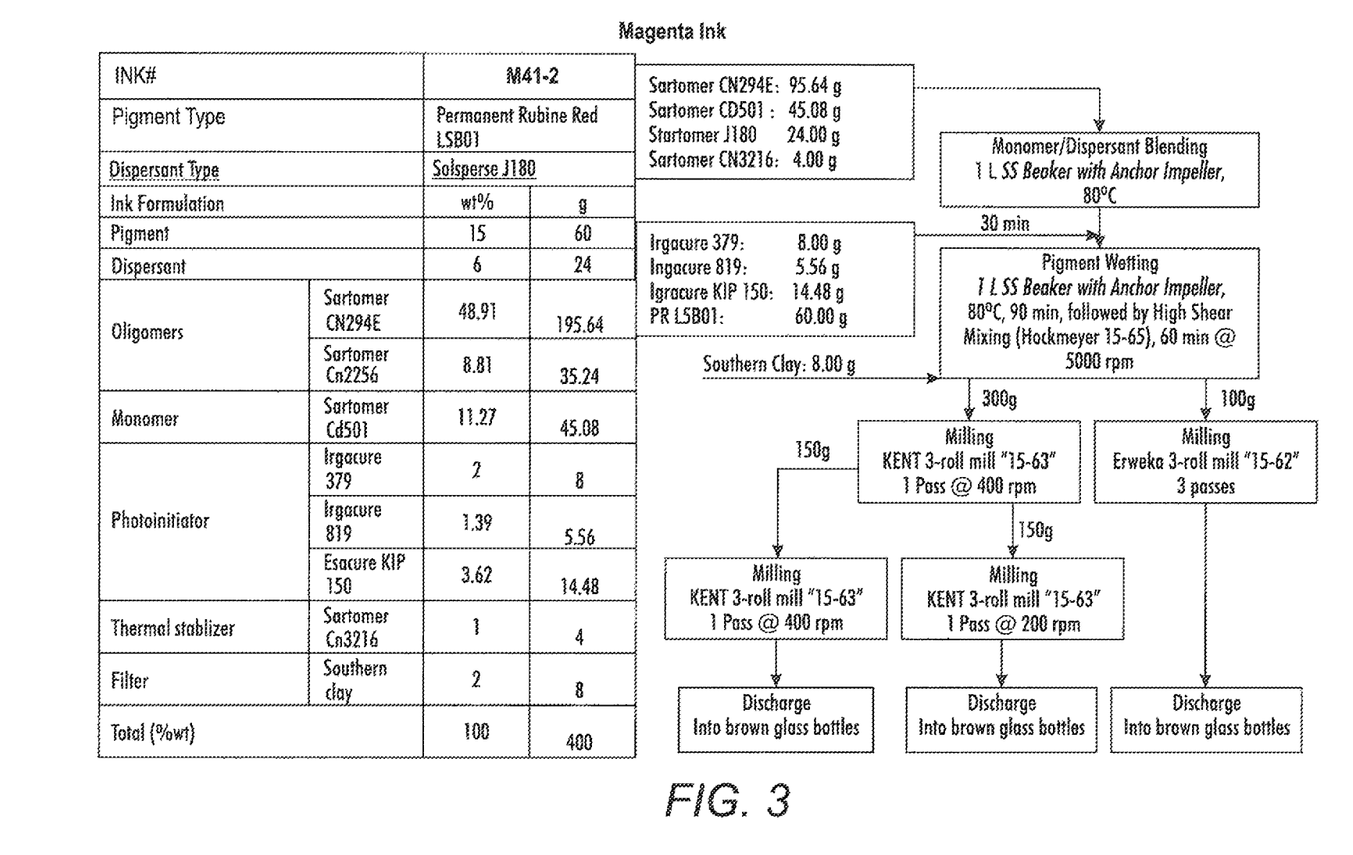
FIG. 3 illustrates an exemplary embodiment for preparing magenta ink as described in the Examples.
Figure 4:
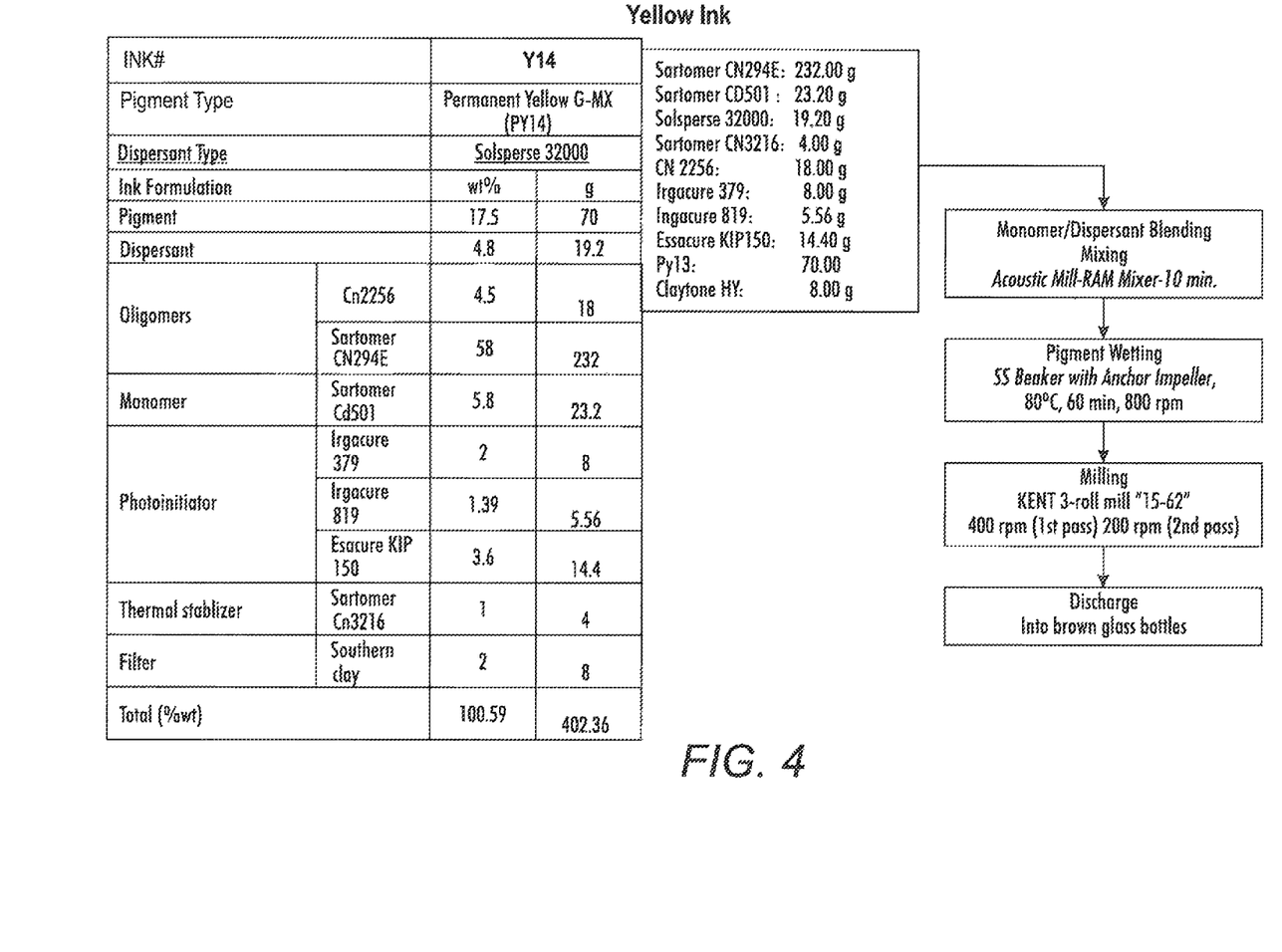
FIG. 4 illustrates an exemplary embodiment for preparing yellow ink as described in the Examples.

FIGS. 2, 3 and 4 describe exemplary ingredients and processes for preparing a cyan ink composition, a magenta ink composition and a yellow ink composition, respectively. These exemplary embodiments are described in the Examples.

In order to prepare a process black image on a substrate, such as a halftone process black image, the cyan ink composition, magenta ink composition and yellow ink composition are provided to the Imaging member and transferred to the substrate as described herein in any effective proportion. For example, the relative ratio of the cyan ink composition to the yellow ink composition is at least about 0.65:1 to about 0.85:1, such as about 0.70-0.80:1, such as about 0.70-0.76:1. In some embodiments, the relative ratio of cyan ink composition to the yellow ink composition is 0.70:1. In other embodiments, the relative ratio of cyan ink composition to the yellow ink composition is about 0.76:1.

In some embodiments, the ratio of the magenta ink composition to the yellow ink composition is at about 0.75:1 to about 0.85:1, such as about 0.80-0.90:1, such as about 0.80-0.88:1. In some embodiments, the relative ratio of magenta ink composition to the yellow ink composition is 0.88:1. In other embodiments, the relative ratio of magenta ink composition to the yellow ink composition is about 0.80:1.

The process black ink composition in accordance with the present disclosure is not limited to use in digital offset printing. The process black ink composition disclosed herein may also be useful in conventional offset printing or hybrid conventional offset and digital offset printing systems. Nonetheless, the process black ink compositions of the present disclosure meet systems requirements that are unique to digital offset printing systems. In particular, the present process black ink compositions satisfy wetting and release requirements imposed by the re-imageable imaging member of ink-based digital printing systems. Further, the process black ink compositions of the present disclosure are compatible with dampening fluids suitable for ink-based digital printing, including non-aqueous dampening fluids. The process black ink compositions of the present disclosure are also enabled for transfer from an ink delivery system such as anilox roll to the imaging member, e.g., re-imageable offset plate.

The examples and other embodiments described herein are exemplary and not intended to be limiting in describing the full scope of compositions and methods of this disclosure. Equivalent changes, modifications and variations of specific embodiments, materials, compositions and methods may be made within the scope of the present disclosure with substantially similar results.

EXAMPLES

Example 1

Preparation of Cyan, Magenta and Yellow Inks

A number of inks were formulated in order to find the optimum ratio of cyan, magenta and yellow pigment dispersions to formulate an optimum process black as follows.

Cyan Ink

FIG. 2 shows the process for a preparation of a cyan ink. Based on a 400 gram total scale, dispersant, monomer, oligomers and stabilizer as described in FIG. 2 or Table 1 were added to a 1 L stainless steel vessel. The vessel was placed on a heating mantle, available from IKA® Works, Inc., Wilmington, Del., equipped with a thermocouple and stirrer apparatus (IKA®) and an anchor impeller. The components in the vessel were stirred for about 30 minutes at about 80° C. The photo-initiators were then slowly added with stirring at about 80° C. for about 15 minutes. With the vehicle base components solubilized, 60 g (15 wt. %) of cyan pigment (Irgalite® Blue GLO, Ciba Specialty Chemicals, Tarrytown, N.Y.) were added to the vehicle and stirred. The pigmented mixture was then allowed to stir for about 60 minutes at 80° C. The vessel containing the pigmented mixture was then transferred to a high speed shearing mill (Hockmeyer Equipment Corporation, Elizabeth City, N.C.) equipped with a 40 mm diameter high shear Cowles blade, which was then stirred at 5000 RPM for about 45 minutes. At this point, clay was slowly added to the pigmented mixture and then re-stirred for about another 15 minutes.

The thoroughly mixed component mixture was then qualitatively transferred to a 3-roll mill apparatus manufactured by Kent Machine Works, Pendleton, Ind., where the material composite paste was passed three times and then discharged into brown glass bottles.

Magenta Ink

FIG. 3 shows the process for preparation of magenta ink. The magenta ink was prepared using the components described in FIG. 3 or Table 1. Dispersant, monomer, oligomers and stabilizer were first added to a 1 L stainless steel vessel and mixed as described above for the cyan ink. The photo-initiators were then slowly added with stirring at about 80° C. for about 15 minutes. With the curable vehicle base components solubilized, 60 g (15 wt. %) of magenta pigment (PR L5B01, Clariant International Ltd Muttenz, Switzerland) were added to the vehicle and stirred. The pigmented mixture was then allowed to stir for about 90 minutes at 80° C. The vessel containing the pigmented mixture was then transferred to a high speed shearing mill, Hockmeyer 15-65 (Hockmeyer Equipment Corporation, Elizabeth City, N.C.) equipped with a 40 mm diameter high shear Cowles blade, which was then stirred at 5000 RPM for about 45 minutes. At this point, clay was slowly added to the pigmented mixture and then re-stirred for about another 15 minutes.

The pigmented mixture was then split into a 100 gram portion and a 300 gram portion. The 100 gram portion was passed three times through an Erweka 3-roll mill (ERWEKA GmbH, Heusenstamm, Germany) and then discharged into glass brown bottles. This process simulates energy density 3 roll mill input using about 300 grams in a 3-roll Kent mill (2 pass).

The 300 gram portion was passed through a 3-roll mill apparatus (Kent Machine Works) at an input roll speed of 400 RPM and then split into two 150 gram portions. One 150 gram portion was then passed through the 3-roll Kent mill apparatus at an input roll speed of 400 RPM and then discharged into brown glass bottles. The second 150 gram portion was passed through the 3-roll Kent mill apparatus at an input roll speed of 200 RPM and then discharged into brown glass bottles.

Yellow Ink

FIG. 4 shows the process for preparation of yellow ink. Components for the yellow ink were prepared by mixing all the components of the yellow ink listed in Table 1, below or FIG. 4 (except for the pigment) by acoustic mixing for about 10 minutes. The mixture was then transferred to a 1 L stainless steel vessel. The vessel was placed on a heating mantle, available from IKA®, equipped with a thermocouple and stirrer apparatus (IKA®) and with an anchor impeller. 70 grams of PY13 (17.5 wt. %) was added to the vessel and the components were stirred at 800 RPM for 60 minutes at 80° C. The component mixture was then qualitatively transferred to a 3-roll mill apparatus (Kent Machine Works) where the material composite paste was passed through a 3-roll mill, first at an input roll speed of 400 RPM for the first pass and then at an input roll speed of 200 RPM for the second pass. The mixture was then discharged into brown glass bottles.

TABLE 1

| Ink Chemical | C139 wt % | M41-2 wt % | Y14 wt % |
|---|---|---|---|
| Pigments and Fillers | | | |
| Hostaperm Blue B4G (PB15:3) | 15 | | |
| Permanent Rubine L5B01 (PR57:1) | | 15 | |
| Permanent Yellow G-MX, PY14 | | | 17.40 |
| Southern Clay Claytone HY | 2.00 | 2.00 | 1.99 |
| Dispersants and Wetting Agents | | | |
| Solsperse J-180 | 4.50 | 6.00 | |
| Solsperse 32000 | | | 4.77 |
| Monomers | | | |
| Sartomer SR 501 | 5.49 | 11.27 | 5.77 |
| Oligomer | | | |
| Sartomer CN294E | 65.00 | 48.91 | 57.66 |
| Sartomer CN2256E | | 8.81 | 4.47 |
| Photo-initiators | | | |
| Irgacure 379 | 2.00 | 2.00 | 1.99 |
| Irgacure 819 | 1.39 | 1.39 | 1.38 |
| Esacure KIP 150 | 3.62 | 3.62 | 3.58 |
| Stabilizers | | | |
| Sartomer CN3216 | 1.00 | 1.00 | 0.99 |
| Total | 100.00 | 100.00 | 100.00 |

Example 2

Process for Black Formulation 5 gram samples of process black ink candidates were prepared according to the formulations described in Table 2, below. The components in each formulation were mixed together with a spatula on a glass surface to obtain a homogenous mixture.

TABLE 2

| StdOrder | RunOrder | Cyan | Magenta | Yellow |
|---|---|---|---|---|
| 7 | 1 | 1.63 | 2.21 | 1.16 |
| 1 | 2 | 1.48 | 1.48 | 2.04 |
| 4 | 3 | 1.83 | 1.83 | 1.33 |
| 2 | 4 | 2.58 | 1.43 | 0.99 |
| 5 | 5 | 1.66 | 1.66 | 1.68 |
| 6 | 6 | 1.63 | 2.21 | 1.16 |
| 3 | 7 | 1.43 | 2.58 | 0.99 |

Analysis of the first seven inks led to the formulation of a further 6 inks (Table 3). The inks in standard order 8 to 13 were part of an iterative optimization that first looked at minimizing the dE2000 values between a Pantone Standard (EA) and the present inks. In a second stage, an attempt was made to minimize dE2000 values for all of the Pantone® Standards at the same time. A final optimum Pantone® Standard Process Black was obtained (Sample 13, in Table 3, below) by minimizing the dE2000 of the ink with reference to Pantone® Standard Process Black to obtain a target optical density (OD) of 1.5, while minimizing differences in a* and b* between the 2 blacks at a target OD of 1.0. This was found beneficial to minimize color shift often seen in process blacks when going from a high to a low OD.

For the optimum candidate, Sample 13, the L*,a*,b* values were 20.35, 3.82 and 4.25, respectively, at a normalized OD of 1.5 for a standard dE2000 value of 3.16 and 2.85. The target L*,a* and b* values for Pantone® Standard Black is 22.07, 1.57 and 4.26, respectively, as shown in Table 4, below. Accordingly, black inks were successfully formulated. The process black ink was printed using digital offset lithography printing architecture. The transfer efficiency was 95% without pre-cure. Inks demonstrating 95% transfer efficiency without pre-cure display 100% transfer efficiency with a pre-cure.

TABLE 3

| Std Order | Cyan | Magenta | Yellow |
|---|---|---|---|
| 8 | 1.70 | 1.51 | 1.78 |
| 9 | 1.62 | 1.90 | 1.48 |
| 10 | 1.61 | 1.43 | 1.96 |
| 11 | 1.47 | 1.91 | 1.63 |
| 12 | 1.55 | 1.82 | 1.64 |
| 13 | 1.43 | 1.80 | 1.76 |

TABLE 4

| | | Pantone ® Standards | | |
|---|---|---|---|---|
| | | L* | a* | b* |
| 1 | Yellow | 87.49 | −8.63 | 104.81 |
| 2 | Orange 021 | 60.69 | 57.72 | 72.87 |
| 3 | Warm Red | 58.72 | 63.05 | 40.48 |
| 4 | Red 032 | 52.66 | 69.05 | 36.48 |
| 5 | Rubine Red | 43.01 | 73.52 | 4.88 |
| 6 | Rhodamine Red | 50.53 | 78.77 | −18.61 |
| 7 | Purple | 46.56 | 70.18 | −44.16 |
| 8 | Violet | 26.90 | 54.91 | −61.72 |
| 9 | Blue 072 | 24.39 | 48.09 | −72.73 |
| 10 | Reflex Blue | 22.76 | 38.32 | −65.98 |
| 11 | Process Blue | 48.44 | −22.42 | −48.93 |
| 12 | Green | 61.65 | −71.98 | 4.13 |
| 13 | Yellow | 87.49 | −8.63 | 104.81 |
| 14 | Black | 22.07 | 1.57 | 4.26 |

Example 3

Novel, Scalable Ink Processing for Process Black Inks

Prints having different optical densities were generated and the dE2000 values were obtained. The dE2000 values under D65 illumination are depicted in Table 5. Standard Pantone® Black is used as the reference value. A dE2000 value of 1 or less between two colors that are not touching one another is barely perceptible using average printing presses, given that human vision is more sensitive to color difference if two colors actually touch each other. Any dE2000 value less than 3 is considered to be an acceptable match.

TABLE 5

| | | | Measured Values | | |
|---|---|---|---|---|---|
| OD | dE2000 | dE | L* | a* | b* |
| 1.43 | 1.3 | 1.1 | 22.39 | 2.31 | 3.51 |
| 1.57 | 2.82 | 3.78 | 18.4 | 2.39 | 3.84 |
| 1.618 | 3.58 | 5.02 | 17.24 | 1.86 | 2.91 |

In a separate experiment and to demonstrate a new scalable process for mixed-pigment inks, process black ink was formulated with a ratio of pigments corresponding to the ratio in described for Sample 13 above. Normalized to 1, the proportions of pigments used for the process black ink are shown in Table 6. As seen in Table 6, the process black ink preparation (60 g) included 3.67 g of yellow pigment, 3.24 grams of magenta pigment, 2.57 grams of cyan pigment.

The pigments were wet by an acoustic mixing process prior to processing with the remaining components. Mixers for acoustic mixing operate at the mechanical resonance. At this operating parameter, a lossless transfer of the mixer's mechanical energy into the materials being mixed occurs by the propagation of an acoustic pressure wave into the mixing vessel. This is achieved by matching the mechanical operation of the mixer with the properties and characteristics of the range of materials to be mixed. The operating characteristics of the mixer are automatically sensed and controlled to keep the system at the mixing condition established to provide the best mixing performance. Resonant ACOUSTIC® Mixers are available in three sizes: bench top pint, production scale 5 gallon and 55 gallon systems. According to the literature, various applications have demonstrated that the same mixing time is required irrespective of the mix load size. This trend is consistent for applications ranging from gas-liquid hydrogenations through powder blending and coating to loaded resins with viscosities up to 100,000,000 cP.

In the present example, the sample was processed in a RESODYN® RAM for 10 minutes at 90% intensity and 60 Hz frequency. Once the pigments were well blended, the rest of the components were weighed in the bottle and processed for another 10 minutes at 90% intensity and 60 Hz frequency. The processed sample was then discharged into a metal beaker and stirred with heating using an anchor impeller for about 60 minutes at 80° C. The ink was finally passed three times though a 3-roll mill and discharged into brown bottles.

TABLE 6

| | Actual Amount of Pigment in 5 g | Experimental Proportion for process black (g) | Density of pigment g/cm$^3$ (generic average from literature) |
|---|---|---|---|
| cyan | 0.2150 | 0.271 | 1.65 |
| magenta | 0.2705 | 0.341 | 1.56 |
| yellow | 0.3069 | 0.387 | 1.25 |

Example 4

Rheological Properties of Process Black

Figure 5:
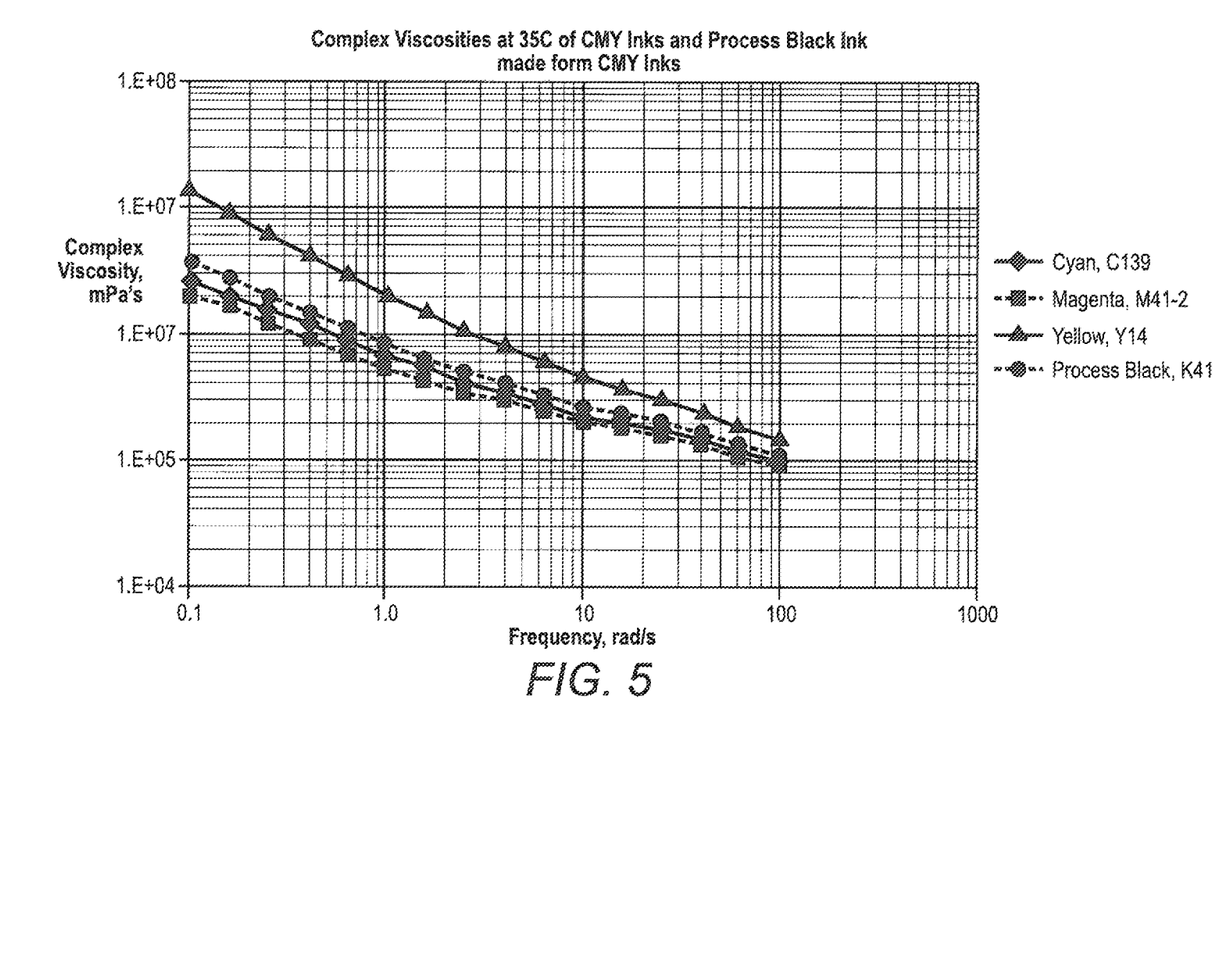
FIG. 5 illustrates viscosities at 35° C. of a cyan ink, a magenta ink, a yellow ink and a process black ink.

The rheological properties of the process black were determined under the same conditions as the cyan, magenta and yellow ink used to determine the pigment ratios. Table 7 and FIG. 5 depict the viscosity and shear thinning index of the inks. These data show that the process black properties are predictable from the properties of the starting primary colors, which demonstrates that the selection of the pigments was appropriate and that no strong pigment-pigment interactions exist.

TABLE 7

| Metric | Cyan, C139 | Magenta M41-2 | Yellow, Y14 | Black, K41 |
|---|---|---|---|---|
| Viscosity (0.1 rad/sec) mPa · s | 2.66E+06 | 2.14E+06 | 1.37E+07 | 3.66E+06 |
| Viscosity (0.4 rad/sec) mPa · s | 1.18E+06 | 9.08E+05 | 4.36E+06 | 1.44E+06 |
| Viscosity (1 rad/sec) mPa · s | 6.79E+05 | 5.39E+05 | 2.10E+06 | 8.11E+05 |
| Viscosity (4 rad/sec) mPa · s | 3.36E+05 | 2.92E+05 | 8.00E+05 | 4.01E+05 |
| Viscosity (10 rad/sec) mPa · s | 2.26E+05 | 2.11E+05 | 4.69E+05 | 2.73E+05 |
| Viscosity (40 rad/sec) mPa · s | 1.30E+05 | 1.32E+05 | 2.32E+05 | 1.59E+05 |
| Viscosity (100 rad/sec) mPa · s | 8.78E+04 | 9.18E+04 | 1.45E+04 | 1.06E+05 |
| Shear Thinning Index (0.4/0.1) | 0.45 | 0.42 | 0.32 | 0.39 |
| Shear Thinning Index (4/1) | 0.50 | 0.54 | 0.38 | 0.49 |
| Shear Thinning index (40/10) | 0.57 | 0.63 | 0.50 | 0.58 |

Example 5

Hand Transfer of Inks onto Substrate and OD Data Analysis

Each of the inks were transferred onto XEROX® Digital Color Elite Gloss (DCEG) paper at different densities, such that the resultant visible optical densities ranged from about 1 to about 2, the L* brightness of the transferred images ranged from about 8 to about 40 after having been cured using a Fusion UV Lighthammer L6 curing station equipped with D bulb from Heraeus Noblelight America LLC. The applied energy doses for UW, UVA, UVB and UVC bands were 640, 1401, 420 and 37 mJ/cm2, respectively. The print image dimensions were on the order of 2 cm by 3 cm.

A best fit of the L*a*b* parameters versus OD was obtained as were L*a*b* values for all of the inks at OD=1.5 and at OD=1.0. Three responses were selected for the final optimization. The dE2000 between the Pantone® Standard and the process black of the present disclosure at OD=1.5 and the a* b* values for the Pantone® Standard versus the a* b* values of the present inks expected at OD=1 was also assessed (data not shown). Scanning Electron Transmission images at 10,000× magnification showed a variation in thickness of the process black prints from about 1.2 to about 3.9 microns with an average thickness in uniform areas of about 2.0 to about 2.4 microns for an average OD ranging from about 1.5 to about 1.7.

Example 6

Characterization of Ink Transfer Prints

In order to assess curing performance, a soft applicator dipped in methylethyl ketone (MEK) solvent at room temperature was spread evenly across (about 2 cm) each of the images on the DCEG paper using constant pressure with fresh MEK being re-applied onto the applicator every 5 double MEK rubs. The number of MEK double rubs required before the paper substrate becomes visible was recorded. These data are shown in FIG. 6.

Figure 6:
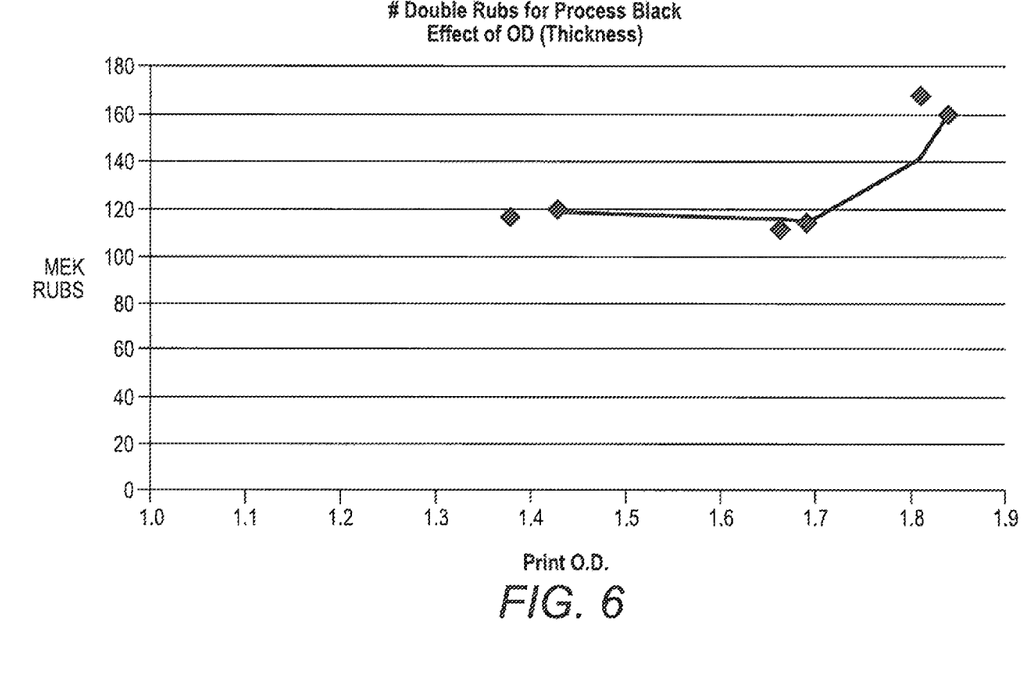
FIG. 6 illustrates the effect of image thickness on the number of double methylethyl ketone (MEK) rubs for process black ink as described in the Examples.

As evident in FIG. 6, excellent curing performance was achieved using the process black ink of the present disclosure. The increase at higher OD is explained by the increase in image thickness necessary to achieve high OD with the process black of the instant disclosure. There was no significant variation in MEK rubs when the OD was below about 1.7. Comparative data were obtained for black inks using carbon black pigments (data not shown). None of the MEK double rubs for carbon black-containing inks exceeded 80.

The Examples demonstrate that it was possible to formulate a carbon black-free process black using pigments such as PB 15:3, PR57:1 and PY 14, where each of the pigments are used at a relative ratio of 0.70:0.88:1.0. This deviates from the expected ratio (where pigments are used at an equal volume ratio). Corrected for density, the expected relative ratio is 0.76:0.8:1.0.

What is claimed is:

1. A process black ink composition for digital offset printing comprising:
   a cyan colorant comprising a cyan pigment,
   a magenta colorant comprising a magenta pigment and
   a yellow colorant comprising a yellow pigment,
   wherein the process black ink composition comprises a total amount of pigment of at least about 15 wt %,
   a photo-initiator,
   a dispersant, and
   a curable ink vehicle component comprising at least one component selected from the group consisting of a curable monomer and a curable oligomer;
   wherein the process black ink composition comprises a ratio of the cyan colorant to the yellow colorant of 0.70-0.80:1.0 and a ratio of the magenta colorant to the yellow colorant of 0.90-0.80:1.0, wherein the process black ink composition does not comprise carbon black, and wherein the process black ink further comprises a filler.

2. The process black ink composition of claim 1, wherein the process black ink further comprises a stabilizer.

3. The process black ink composition of claim 1, wherein the cyan colorant comprises Pigment Blue 15:3, the magenta colorant comprises Pigment Red 57:1 and the yellow colorant comprises a pigment selected from the group consisting of Pigment Yellow 14 and Pigment Yellow 13.

4. The process black ink composition of claim 3, wherein the ratio of the cyan colorant comprising Pigment Blue 15:3 to the yellow colorant comprising the yellow pigment is 0.76:1 and wherein the ratio of the magenta colorant comprising the Pigment Red 57:1 to the yellow colorant comprising the yellow pigment is 0.80:1.0.

5. The process black ink composition of claim 1, wherein the process black ink composition is transferable to a printable substrate from an imaging member at an efficiency of 90% or greater.

6. A method of preparing a process black ink composition, the method comprising:
   a) providing a cyan colorant comprising a cyan pigment, a magenta colorant comprising a magenta pigment and a yellow colorant comprising a yellow pigment, wherein a ratio of the cyan colorant to the yellow colorant is 0.70-0.80:1.0 and a ratio of the magenta colorant to the yellow colorant is 0.90-0.80:1.0,
   b) acoustically mixing the colorants;
   c) acoustically mixing a photo-initiator; a dispersant and at least one curable ink vehicle component selected from the group consisting of a monomer and an oligomer with the acoustically mixed colorants to form a curable ink mixture,
   d) milling the curable ink mixture formed in c) to obtain a process black ink composition, wherein the process black ink composition does not comprise carbon black.

7. The method of claim 6, wherein the cyan colorant comprises Pigment Blue 15:3, the magenta colorant comprises Pigment Red 57:1 and the yellow colorant comprises a pigment selected from the group consisting of Pigment Yellow 14 and Pigment Yellow 13.

8. The method of claim 7, wherein the ratio of the cyan colorant comprising Pigment Blue 15:3 to the yellow colorant comprising the yellow pigment is 0.76:1 and wherein the ratio of the magenta colorant comprising Pigment Red 57:1 to the yellow colorant comprising the yellow pigment is 0.80:1.0.

9. The process of claim 6, further comprising heating and stirring the curable ink mixture formed in c) before milling.

10. The method of claim 6, wherein the curable ink mixture formed in c) further comprises a stabilizer.

11. The method of claim 6, wherein the curable ink mixture formed in c) further comprises a filler.

12. A method of halftone printing, the method comprising:
   providing a cyan ink composition, a magenta ink composition and a yellow ink composition,
   applying the cyan ink composition, the magenta ink composition and the yellow ink composition onto a re-imageable imaging member surface, wherein a ratio of the cyan ink composition to the yellow ink composition is 0.70-0.80:1.0 and a ratio of the magenta ink composition to the yellow ink composition is 0.90-0.80:1.0;
   forming an ink image;
   transferring the ink image from the re-imageable surface of the imaging member onto a printable substrate to form a halftone black image;
   wherein the halftone black image does not comprise carbon black,
   wherein the cyan ink composition comprises at least about 15% by weight of a cyan pigment, the magenta ink composition comprises at least about 15% by weight of a magenta pigment and the yellow ink composition comprises at least about 15% by weight of a yellow pigment,
   and wherein said cyan ink composition, said magenta ink composition and said yellow ink composition each further comprises:
   a photo-initiator,
   a dispersant, and
   a curable ink vehicle component comprising at least one component selected from the group consisting of a curable monomer and a curable oligomer.

13. The method of claim 12, wherein the transferring of the ink image from the re-imageable surface of the imaging member onto a printable substrate is at an efficiency of 90% or greater.

14. The method of claim 12, wherein the method further comprises partially curing the cyan, magenta and yellow ink compositions after applying the cyan, magenta and yellow ink compositions onto a re-imageable imaging member surface.

15. The method of claim 14, wherein the transferring of the ink image from the re-imageable surface of the imaging member onto a printable substrate is at an efficiency of 98% or greater.

16. The method of claim 12, wherein the cyan ink composition comprises Pigment Blue 15:3, the magenta ink composition comprises Pigment Red 57:1 and the yellow ink composition comprises a yellow pigment selected from the group consisting of Pigment Yellow 14 and Pigment Yellow 13.

17. The method of claim 16, wherein the ratio of the cyan ink composition comprising the Pigment Blue 15:3 to the yellow ink composition comprising the yellow pigment is 0.76:1 and wherein the ratio of the magenta ink composition comprising the Pigment Red 57:1 to the yellow composition comprising the yellow pigment is 0.80:1.0.

* * * * *